(12) United States Patent
Tanaka

(10) Patent No.: US 11,477,371 B2
(45) Date of Patent: Oct. 18, 2022

(54) PARTIAL IMAGE GENERATING DEVICE, STORAGE MEDIUM STORING COMPUTER PROGRAM FOR PARTIAL IMAGE GENERATION AND PARTIAL IMAGE GENERATING METHOD

(71) Applicant: TOYOTA JIDOSHA KABUSHIKI KAISHA, Toyota (JP)

(72) Inventor: Masahiro Tanaka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/347,638

(22) Filed: Jun. 15, 2021

(65) Prior Publication Data

US 2021/0400190 A1 Dec. 23, 2021

(30) Foreign Application Priority Data

Jun. 22, 2020 (JP) .............................. JP2020-107136

(51) Int. Cl.
*H04N 5/232* (2006.01)
*B60R 11/04* (2006.01)
*G06T 7/73* (2017.01)

(52) U.S. Cl.
CPC ......... *H04N 5/23229* (2013.01); *B60R 11/04* (2013.01); *G06T 7/74* (2017.01); *B60R 2300/205* (2013.01); *B60R 2300/302* (2013.01); *G06T 2207/30252* (2013.01)

(58) Field of Classification Search
CPC .... B60R 1/28; B60R 1/22; B60R 1/23; B60R 1/24; B60R 1/27; B60R 2300/205; B60R 2300/306; G06T 2207/30252; G01C 21/3804; G01C 21/3822
See application file for complete search history.

(56) References Cited

U.S. PATENT DOCUMENTS

| 8,175,806 | B2* | 5/2012 | Kodaira | G08G 1/09675 382/104 |
| 11,270,131 | B2* | 3/2022 | Sugie | G01C 21/3815 |
| 2010/0121561 | A1* | 5/2010 | Kodaira | G06V 20/588 382/104 |

(Continued)

FOREIGN PATENT DOCUMENTS

| JP | 2012020663 A | * | 2/2012 |
| JP | 2014071629 A | * | 4/2014 |

(Continued)

*Primary Examiner* — John Villecco
(74) *Attorney, Agent, or Firm* — Dickinson Wright, PLLC

(57) ABSTRACT

A partial image generating device has a processor configured to generate a partial image from an image in which the environment surrounding a vehicle has been photographed using an imaging device provided in the vehicle, and to assess whether or not the road represented in the image is straight. The processor is configured so that, when it has been assessed that the road represented in the image is straight, it generates a partial image by cutting out a first region in the image that is estimated to contain the road, based on the vanishing point of the road, and when it has assessed that the road represented in the image is not straight, it generates a partial image by cutting out a second region in the image determined based on the type of the vehicle.

11 Claims, 8 Drawing Sheets

(56) References Cited

U.S. PATENT DOCUMENTS

| | | | | |
|---|---|---|---|---|
| 2015/0227800 A1* | 8/2015 | Takemae | ............... | E01F 11/00 |
| | | | | 382/104 |
| 2017/0220877 A1* | 8/2017 | Kakegawa | ........... | G06V 20/584 |
| 2020/0082179 A1* | 3/2020 | Sugie | ................ | G06V 20/56 |
| 2021/0231457 A1* | 7/2021 | Neyama | ............ | G01C 21/3841 |

FOREIGN PATENT DOCUMENTS

| | | | |
|---|---|---|---|
| JP | 2015018515 A | | 1/2015 |
| JP | 2015204017 A | | 11/2015 |
| JP | 2015210729 A | * | 11/2015 |
| JP | 2019003606 A | | 1/2019 |
| JP | 2019207541 A | * | 12/2019 |
| JP | 2022001975 A | * | 1/2022 |
| KR | 20120055850 A | * | 6/2012 |
| KR | 20140104516 A | * | 8/2014 |

* cited by examiner

FIG. 1A
FIG. 1B
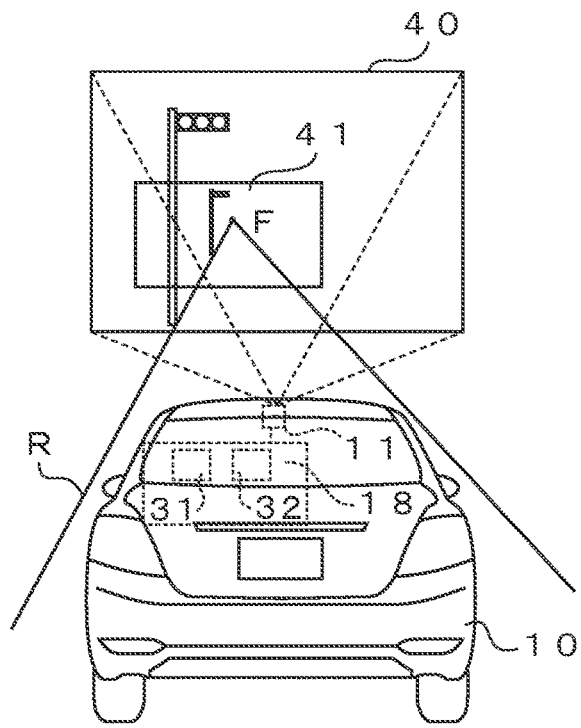
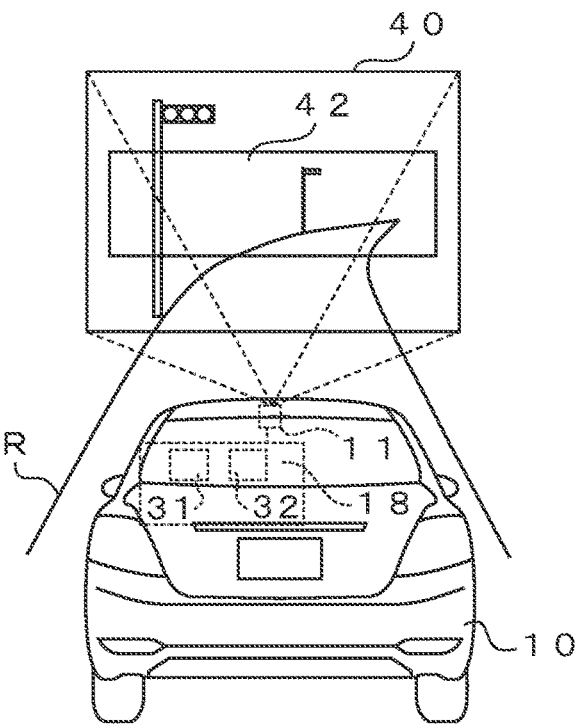

| TYPE NUMBER | REFERENCE LOCATION | LENGTH IN LATERAL DIRECTION | LENGTH IN LONGITUDINAL DIRECTION |
|---|---|---|---|
| T1 | q1, r1 | W2 | H2 |
| T2 | q2, r2 | W3 | H3 |
| T3 | q3, r3 | W4 | H4 |

PARTIAL IMAGE GENERATING DEVICE, STORAGE MEDIUM STORING COMPUTER PROGRAM FOR PARTIAL IMAGE GENERATION AND PARTIAL IMAGE GENERATING METHOD

FIELD

The present invention relates to a partial image generating device, a storage medium that stores a computer program for partial image generation and a partial image generating method.

BACKGROUND

High-precision road maps that are referred to for automatic control of vehicles by vehicle self-driving systems must accurately represent road-associated information. It is desirable for a map to maximize the number of vehicle roads and road-associated road features registered in it.

Road features such as lane marking lines, signs and structures also often vary or are relocated. It is therefore preferred for a map to have the information for such road features in a constantly updated state.

It has been proposed for a server to carry out map registering and map updating by collecting road-associated information from multiple vehicles, as appropriate. As an example, a vehicle may sequentially photograph the area ahead of the vehicle using a camera provided in the vehicle, cutting out a partial image from the region estimated to contain the road in each photographed image, and sending it to the server. The server generates a bird's eye image for each of the plurality of partial images that are received, combining the plurality of bird's eye images to generate an image that contains the road (see Japanese Unexamined Patent Publication No. 2015-204017, for example). Based on the generated image, the server detects road features and registers new road features in the map in association with the road. The server also updates the map in regard to changed road features, based on the image.

SUMMARY

The image photographed by the vehicle camera will sometimes differ depending on the mounting position and optical axis of the camera of each vehicle. The locations of roads in partial images received from the vehicle may therefore differ depending on partial images. Therefore, when the server uses the plurality of partial images received from multiple vehicles to generate the bird's eye images of the road, it is sometimes difficult to combine the bird's eye images to generate an image containing the road.

It is an object of the present invention to provide a partial image generating device that generates partial images, wherein the device facilitates the process of converting each of a plurality of partial images into a bird's eye image and combining the plurality of bird's eye images in order to generate an image containing a road.

According to one embodiment, a partial image generating device is provided. The partial image generating device has a partial image generating unit that generates a partial image from an image in which the environment surrounding a vehicle has been photographed using an imaging unit provided in the vehicle, and an assessment unit that assesses whether or not the road represented in the image is straight, wherein the partial image generating unit generates the partial image by cutting out a first region in the image that is estimated to contain the road based on the vanishing point of the road, when it has been assessed that the road represented in the image is straight, or generates the partial image by cutting out a second region in the image that is determined based on the type of the vehicle, when it has been assessed that the road represented in the image is not straight.

In this partial image generating device, it is preferred that the dimension in the widthwise of the vehicle direction in the second region is larger than in the first region.

In this partial image generating device, it is preferred that the partial image generating device has a storage unit that stores map information, and the assessment unit assesses whether or not the road represented in the image is straight, based on the location of the vehicle at the time the image was photographed, and the map information stored in the storage unit.

In this partial image generating device, it is preferred that the assessment unit assesses whether or not the road represented in the image is straight, based on the shape of the road represented in the image.

In this partial image generating device, it is preferred that the partial image generating device has a first correcting unit which assesses whether the road represented in the image is a clockwise road or a counterclockwise road, when it has been assessed that the road represented in the image is not straight, and corrects the location of the second region in the image based on the assessment results.

In this partial image generating device, it is preferred that the partial image generating device has a second correcting unit which widens the dimensions of the first region or second region in the height direction of the vehicle, when it has been assessed that the vehicle was traveling on a road with high road surface roughness at the time the image was photographed, compared to when it has not been assessed that the vehicle was traveling on a road with high road surface roughness.

In this partial image generating device, it is preferred that the second correcting unit assesses whether or not the vehicle is traveling on a road with high road surface roughness based on changes in the pitch angle of the vehicle.

In this partial image generating device, it is preferred that the partial image generating device has a third correcting unit which changes the dimensions of the first region or second region based on the speed of the vehicle at the time the image was photographed.

In this partial image generating device, it is preferred that when the speed of the vehicle is a high speed, the third correcting unit widens the dimensions of the first region or second region compared to when the speed of the vehicle is a low speed.

According to another embodiment, a computer program for partial image generation is provided. The computer program causes the processor to generate a partial image from an image in which the environment surrounding a vehicle has been photographed using an imaging device provided in the vehicle and assess whether or not the road represented in the image is straight, wherein the computer program causes the processor to generate the partial image by cutting out a first region in the image that is estimated to contain the road based on the vanishing point of the road, when it has been assessed that the road represented in the image is straight, or to generate the partial image by cutting out a second region in the image that is determined based on the type of the vehicle, when it has been assessed that the road represented in the image is not straight.

According to another embodiment, a partial image generation method is provided. In the partial image generation method, a partial image generating device executes to generate a partial image from an image in which the environment surrounding a vehicle has been photographed using an imaging device provided in the vehicle and assess whether or not the road represented in the image is straight, wherein the partial image generating device executes to generate the partial image by cutting out a first region in the image that is estimated to contain the road based on the vanishing point of the road, when it has been assessed that the road represented in the image is straight, or to generate the partial image by cutting out a second region in the image that is determined based on the type of the vehicle, when it has been assessed that the road represented in the image is not straight.

The partial image generating device of the invention exhibits an effect that allows a partial image to be generated, facilitating the process of converting each of a plurality of partial images into a bird's eye image and combining the plurality of bird's eye images to generate an image containing a road.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 1A is a diagram showing an overview of operation of a partial image generating device.

FIG. 1B is a diagram showing an overview of operation of a partial image generating device.

FIG. 3 is a table showing the relationship between head-up display type number and cut-out region.

DESCRIPTION OF EMBODIMENTS

Figure 1C:
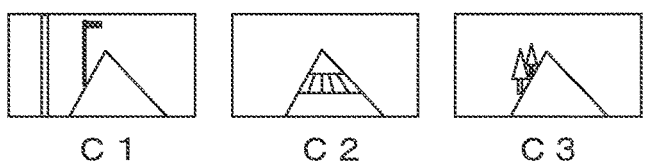
FIG. 1C is a diagram showing an overview of operation of a partial image generating device.

FIG. 1A to FIG. 1E are diagrams showing an overview of operation of a partial image generating device. Operation of the partial image generating device disclosed herein will now be described in overview with reference to FIG. 1A to FIG. 1E.

For the embodiment, when a vehicle 10 is traveling on a road R, the partial image generating unit 31 of the partial image generating device 18 mounted in the vehicle 10 uses a camera 11, as an example of an imaging unit provided in the vehicle 10, to photograph a camera image 40 in which the environment surrounding the vehicle 10 is represented.

The assessment unit 32 of the partial image generating device 18 assesses whether or not the road represented in the camera image 40 is straight, based on map information or the camera image 40.

As shown in FIG. 1A, when it has been assessed that the road represented in the camera image 40 is straight, the partial image generating unit 31 generates a partial image by cutting out from the camera image 40 a cut-out region 41 which is estimated to contain the road, as determined based on the vanishing point F of the road.

When it has been assessed that the road represented in the camera image 40 is not straight, however, it is usually difficult to estimate the vanishing point F of the road. Therefore, as shown in FIG. 1B, the partial image generating unit 31 generates a partial image by cutting out from the camera image 40 a cut-out region 42 in the camera image 40 that has been determined based on the type of vehicle 10. The type of vehicle may be, for example, a sedan, hatchback or sport utility vehicle (SUV). Since the height at which the camera is mounted on the vehicle and the length of the bonnet differ depending on the type of vehicle, the orientation of the optical axis of the camera also differs. Therefore, the region in the camera image 40 estimated to contain the road will differ depending on the type of vehicle. The partial image generating unit 31 thus determines the cut-out region 42 in the camera image 40 according to the type of vehicle.

The partial image generating unit 31 sends the partial image to a server (not shown), together with the location of the vehicle 10 where the partial image was photographed. In the example shown in FIG. 1C, the server receives from the vehicle 10 two partial images C1, C2 in which the road R is represented. The server also receives a partial image C3 in which the same road R is represented, from another vehicle (not shown). The partial image C1 and C2 and the partial image C3 are images received from different vehicles, but the road R is represented at the same location in all of the three partial images C1, C2, C3.

Figure 1D:
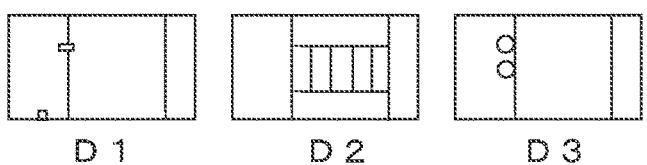
FIG. 1D is a diagram showing an overview of operation of a partial image generating device.
Figure 1E:
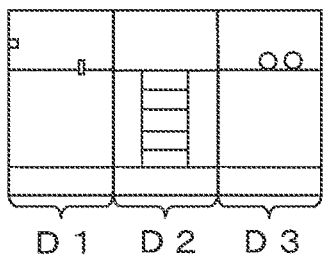
FIG. 1E is a diagram showing an overview of operation of a partial image generating device.

As shown in FIG. 1D, the server generates bird's eye images D1, D2, D3 for each of the three partial images C1, C2, C3 in which the same road R is represented. As shown in FIG. 1E, the server also combines the three bird's eye images D1, D2, D3 to generate one road image in which the road R is represented. Since the road is represented at the same location in all of the partial images C1, C2, C3, the server can combine the three bird's eye images D1, D2, D3 generated from the three partial images photographed for the same road R, to easily generate a road image in which the road R is represented.

When the images photographed by the vehicle cameras differ in the camera mounting positions and optical axes for each vehicle, the locations of the road represented in the partial images received from the vehicles will differ depending on the image, even for the same road. Therefore, the road location will differ in each bird's eye image that was generated from each of the different partial images. In the prior art, the server has had increased load for the processing necessary to combine the plurality of bird's eye images in order to generate an image in which the road is represented.

Figure 2:
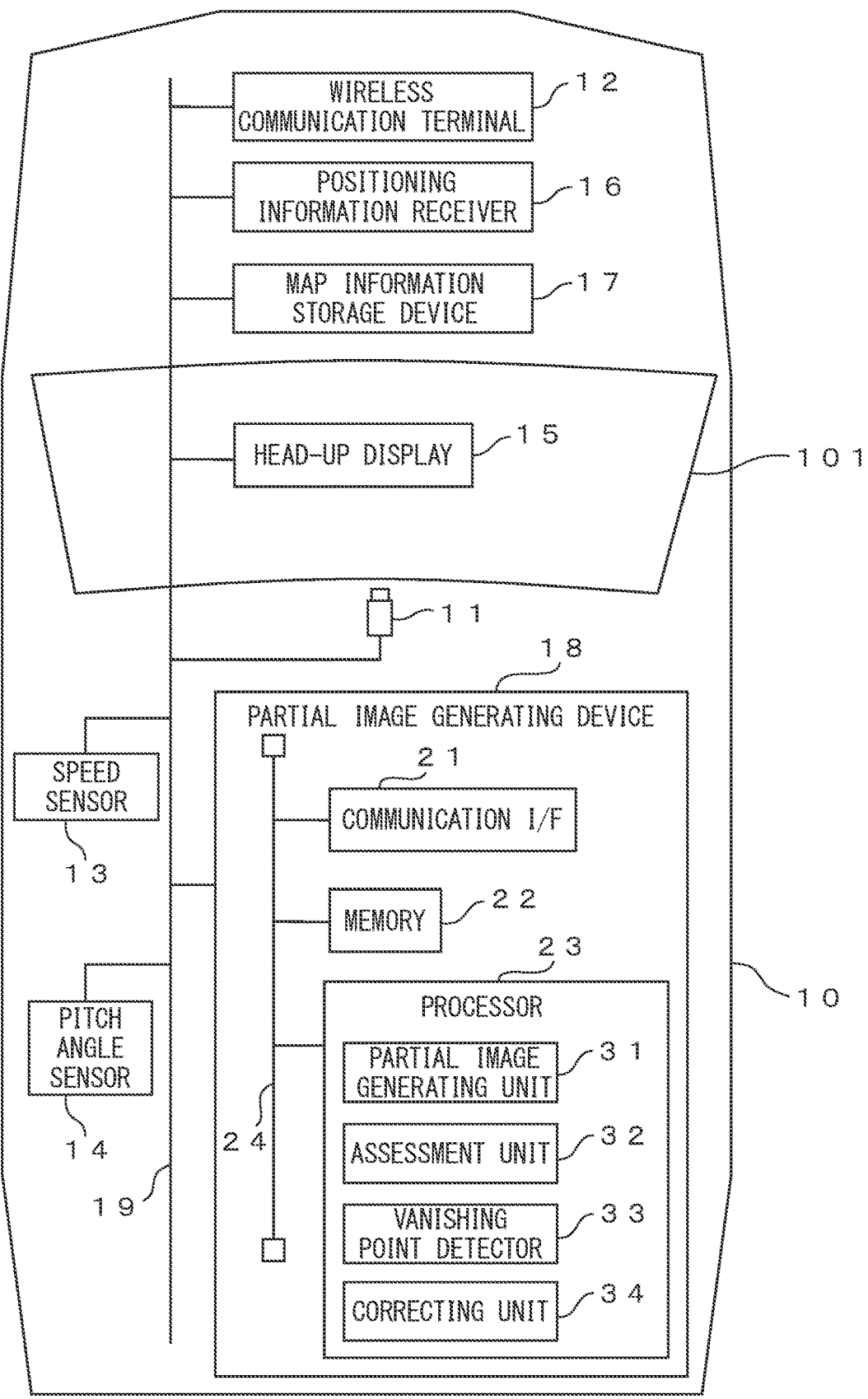
FIG. 2 is a general schematic drawing of a vehicle in which a partial image generating device is mounted.

FIG. 2 is a general schematic drawing of a vehicle 10 in which a partial image generating device 18 is mounted. The vehicle 10 comprises a camera 11, a wireless communication terminal 12, a speed sensor 13, a pitch angle sensor 14, a head-up display 15, a positioning information receiver 16, a map information storage device 17, a partial image generating device 18 and a front window 101.

The camera 11, wireless communication terminal 12, speed sensor 13, pitch angle sensor 14, head-up display 15, positioning information receiver 16, map information storage device 17 and partial image generating device 18 are connected in a communicable manner via an in-vehicle network 19 that conforms to controller area network standards.

The camera 11 is an example of an imaging unit provided in the vehicle 10. The camera 11 is mounted inside the compartment of the vehicle 10 and directed toward the front of the vehicle 10. The camera 11 is controlled by the partial image generating device 18, and for example, a camera image 40 in which the environment of a predetermined region ahead of the vehicle 10 is represented is photographed at a predetermined cycle. The camera image 40 can show the road in the predetermined region ahead of the vehicle 10, and road features such as surface lane marking lines on the road. The camera 11 is mounted on the vehicle 10 in such a manner that the distance between the vehicle 10 and the location where the optical axis crosses the ground ahead of the vehicle 10 is 8.5 m to 16.5 m, for example. The image produced by the camera 11 may be a color image or a gray image. The camera 11 has a 2D detector composed of an array of photoelectric conversion elements with visible light sensitivity, such as a CCD or C-MOS, and an imaging optical system that forms an image of the photographed region on the 2D detector.

The wireless communication terminal 12 is an example of a communication unit, being a device that carries out wireless communication processing conforming to a predetermined wireless communication standard, and for example, it is connected with the server (not shown) through a base station and communication network (not shown).

The speed sensor 13 detects the speed of the vehicle 10. The speed sensor 13 has a measuring device that measures the rotational speed of the tires of the vehicle 10, for example, and detects the vehicle speed based the rotational speed of the tires and the peripheral lengths of the tires. The speed sensor 13 outputs the vehicle speed to the partial image generating device 18 via the in-vehicle network 19. Optionally, the speed sensor 13 may output the tire rotational speed to the partial image generating device 18, and the vehicle speed may be determined at the partial image generating device 18 based on the rotational speed of the tires and the peripheral lengths of the tires.

The pitch angle sensor 14 detects the pitch angle of the vehicle 10. The pitch angle sensor 14 is formed using an acceleration sensor, for example. The pitch angle sensor 14, using a point at the midpoint between the left and right rear wheels of the vehicle 10, and on the ground, as the origin, detects the pitch angle around an xv axis, in a vehicle coordinate system with the traveling direction of the vehicle 10 as the zv axis, the direction perpendicular to the zv axis and parallel to the ground as the xv axis, and the vertical direction as the yv axis. When the vehicle 10 travels on a road with high road surface roughness, or a slanted road, the vehicle 10 moves in rotation around the xv axis, and therefore the pitch angle varies.

The head-up display 15 is controlled by a vehicle control device (not shown), and projects the information associated with traveling of the vehicle 10 onto the front window 101. Since the projection angle and mounting structure of the head-up display 15 differ depending on the type of vehicle in which it is mounted, it has a different type number depending on the type of vehicle. For example, the head-up display 15 projects the traveling route from the current location of the vehicle 10 to the destination, generated by a navigation device (not shown), to the front window 101.

The positioning information receiver 16 outputs positioning information that represents the current location of the vehicle 10. The positioning information receiver 16 may be a GNSS receiver, for example. The positioning information receiver 16 outputs positioning information and the positioning information acquisition time at which the positioning information was acquired, to the camera 11 and partial image generating device 18, each time positioning information is acquired at a predetermined receiving cycle.

The map information storage device 17 stores a map containing roads. Each road is divided into multiple road zones and registered in the map. The curvature radius for each road zone is also registered in the map, in association with the road zone.

The partial image generating device 18 carries out partial image generation processing whereby a partial image is generated from the camera image 40. The partial image generating device 18 also carries out assessment processing whereby it assesses whether or not a road represented in the camera image 40 is straight. The partial image generating device 18 also carries out vanishing point detection processing whereby it detects the vanishing point F of each road in the camera image 40. The partial image generating device 18 also carries out correction processing whereby it corrects the location or dimensions of the cut-out regions in the camera image 40. For this purpose, the partial image generating device 18 has a communication interface 21, a memory 22 and a processor 23. The communication interface 21, memory 22 and processor 23 are connected via signal wires 24.

The communication interface (I/F) 21 is an example of an in-vehicle communication unit, and it has an interface circuit to connect the partial image generating device 18 to an in-vehicle network 19. That is, the communication IF 21 connects the camera 11, wireless communication terminal 12, speed sensor 13, pitch angle sensor 14, head-up display 15, positioning information receiver 16 and map information storage device 17 via the in-vehicle network 19. For example, when a partial image and the location of the vehicle 10 at the time the partial image was photographed are input from the processor 23, the communication interface 21 outputs the input partial image and location of the vehicle 10 at the time the partial image was photographed, to the wireless communication terminal 12.

The memory 22 is an example of a memory unit, and it has a volatile semiconductor memory and a non-volatile semiconductor memory, for example. The memory 22 stores an application computer program and various data to be used for information processing carried out by the processor 23 of the partial image generating device 18. The memory 22 also stores installation position information such as the optical axis direction of the camera 11 and its mounting position, and internal parameters such as the focal length and viewing angle of the imaging optical system. The memory 22 also stores a Table 60 showing the type number of the head-up display 15, and the relationship between the type number and the cut-out region obtained by cutting out a partial image from the camera image 40.

FIG. 3 is a diagram with a table 60 which shows the relationship between head-up display type number and cut-out region. The table 60 has a type number column 601 showing the head-up display type number, a reference location column 602 showing the reference location of the cut-out region in the camera image 40, a lateral length column 603 showing the dimension of the cut-out region in the lateral direction, and a longitudinal length column 604 showing the dimension of the cut-out region in the longitudinal direction. In the type number column 601, there are registered T1 representing the type number of a head-up display mounted in a sedan, T2 representing the type number of a head-up display mounted in a hatchback vehicle, and T3 representing the type number of a head-up display mounted in a sport utility vehicle. The reference location can be represented in an image coordinate system with an xi axis extending to the right and a yi axis extending downward, using the location at the top left corner of the camera image 40 as the origin. The information relating to the cut-out region registered in the table 60 can be determined based on the mounting position and optical axis of the camera and the height of the bonnet, for each type of vehicle.

The processor 23 comprises one or more CPUs (Central Processing Units) and their peripheral circuits. The processor 23 may also have other computing circuits such as a logical operation unit, numerical calculation unit or graphic processing unit. When the processor 23 has multiple CPUs, it may have a separate memory for each CPU. The processor 23 carries out partial image generation processing, assessment processing, vanishing point detection processing and correction processing.

The processor 23 has a partial image generating unit 31 which carries out the partial image generation processing, an assessment unit 32 which carries out the assessment processing, a vanishing point detector 33 which carries out the vanishing point detection processing and a correcting unit 34 which carries out the correction processing. Each of the units of the processor 23 are functional modules driven by a computer program operating on the processor 23, for example. Alternatively, each of the units of the processor 23 may be specialized computing circuits in the processor 23.

Figure 4:
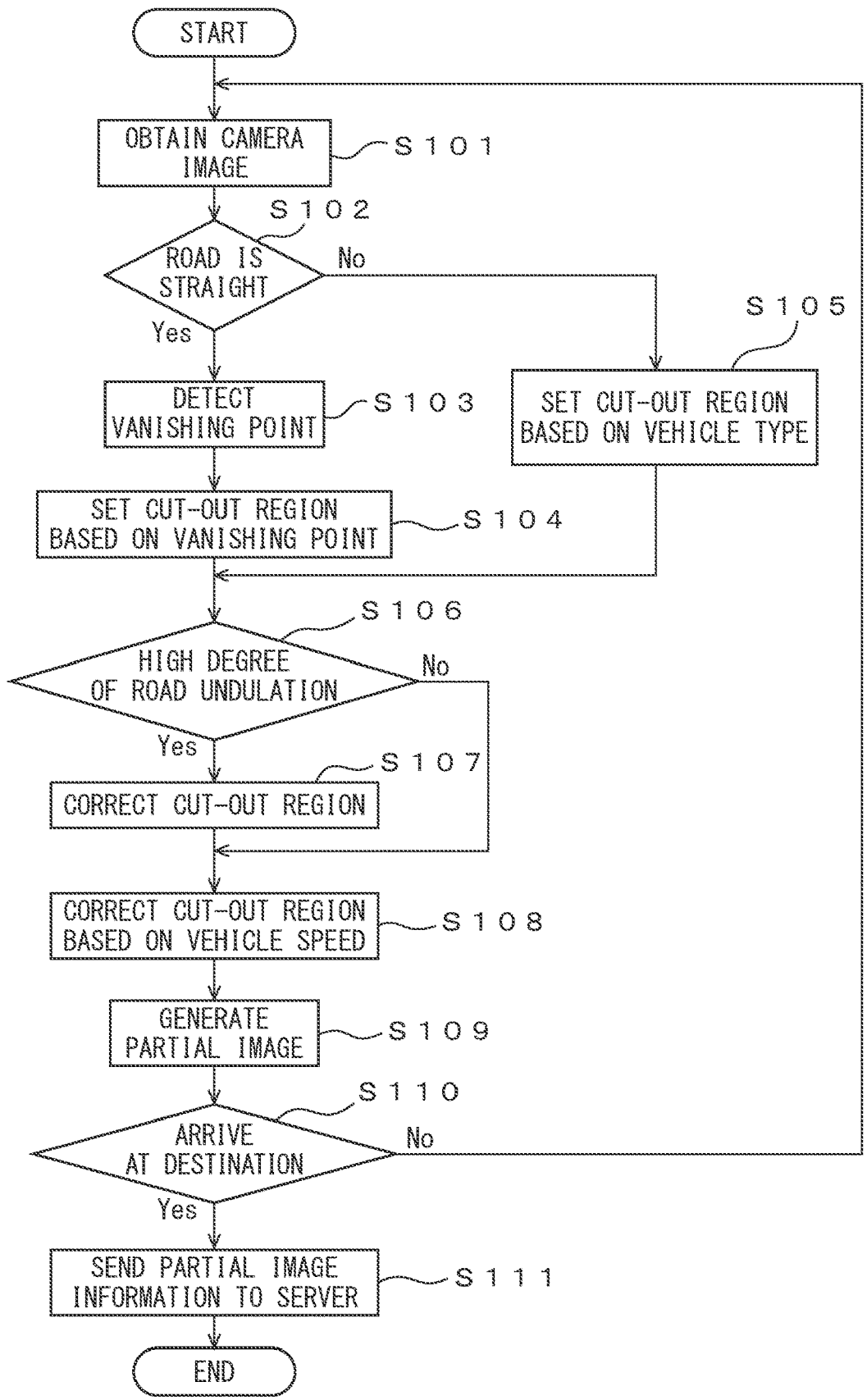
FIG. 4 is an operation flow chart for a partial image generating device.

FIG. 4 is an operation flow chart for the partial image generating device 18. The partial image generating device 18 repeatedly carries out partial image generation processing according to the operation flow chart shown in FIG. 4, while the vehicle 10 is traveling.

The camera 11 provided in the vehicle 10 is controlled by the partial image generating unit 31 of the processor 23 in the partial image generating device 18, to photograph a camera image 40 in which the environment ahead of the vehicle 10 is represented (step S101). The camera 11 outputs the camera image 40 and the camera image photograph time at which the camera image 40 was photographed, to the partial image generating device 18 through the in-vehicle network 19. The camera 11 also outputs the camera image photograph time to the map information storage device 17 through the in-vehicle network 19. Each time the camera image photograph time is received from the camera 11, the map information storage device 17 estimates the location of the vehicle 10 represented in the positioning information at the camera image photograph time (the location of the vehicle 10 at the camera image photograph time), as estimated from the positioning information at a time coinciding with the camera image photograph time, or before or after the camera image photograph time. The map information storage device 17 outputs to the partial image generating device 18 the camera image photograph time, the location of the vehicle 10 at the camera image photograph time, and the map of the predetermined region (for example, 200 m²) containing the location of the vehicle 10 at the camera image photograph time. The assessment unit 32 of the processor 23 of the partial image generating device 18 stores, in the memory 22, the camera image photograph time, the location of the vehicle 10 at the camera image photograph time and the map, in mutual association.

Next, the assessment unit 32 of the processor 23 of the partial image generating device 18 uses the map output from the map information storage device 17 to assess whether or not the road represented in the camera image 40 is straight (step S102). The details regarding assessment processing in step S102 will be described below.

When it has been assessed that the road represented in the camera image 40 is straight (step S102—Yes), the vanishing point detector 33 of the processor 23 of the partial image generating device 18 determines the vanishing point F of the road in the camera image 40 (step S103). The details regarding processing to determine the vanishing point F in step S103 will be described below.

Figure 5:
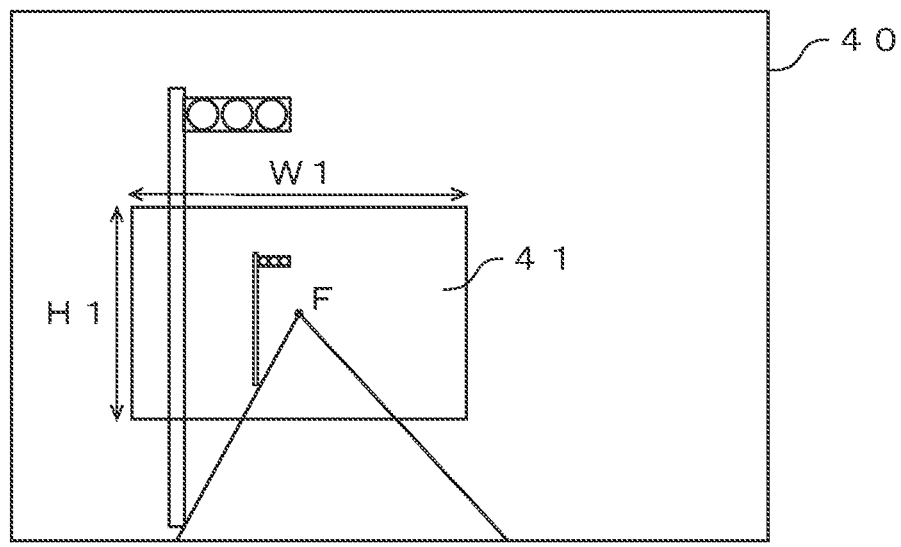
FIG. 5 is a diagram illustrating processing by a partial image generating unit (1).

The partial image generating unit 31 then determines a cut-out region 41 in the camera image 40, based on the vanishing point F of the road (step S104). For example, the partial image generating unit 31 determines the cut-out region 41 so that the vanishing point F of the road is at the center of a preset rectangular shape with length W1 in the lateral direction and length H1 in the longitudinal direction. FIG. 5 shows an example of a cut-out region 41 determined from a camera image 40 based on a vanishing point F. Another method may also be used, such as determining the cut-out region 41 based on the positional relationship between the vanishing point F and a predetermined reference location.

Figure 6:
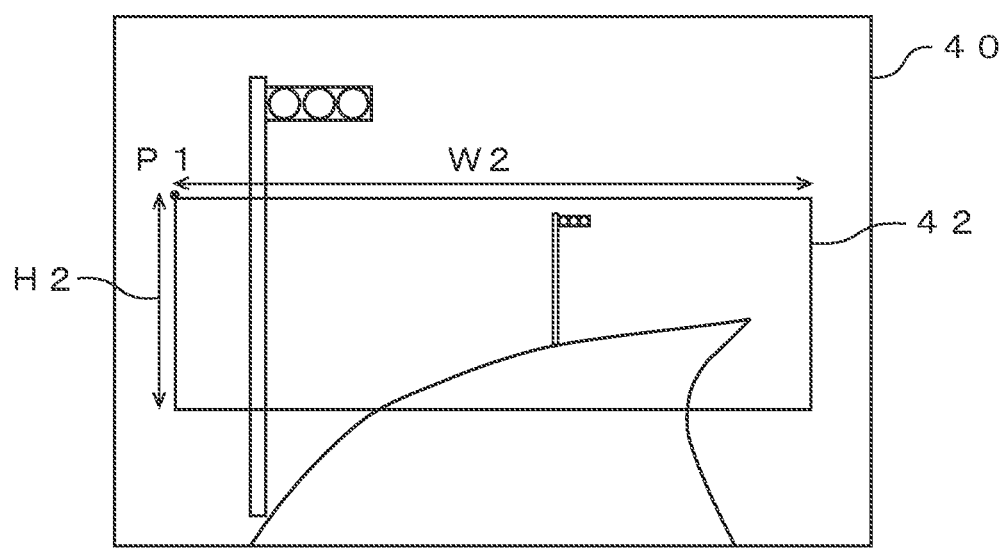
FIG. 6 is a diagram illustrating processing by a partial image generating unit (2).

When it has been assessed that the road represented in the camera image 40 is not straight (step S102—No), the partial image generating unit 31 determines the cut-out region in the camera image 40 based on the type of vehicle 10 (step S105). For example, the partial image generating unit 31 reads out the type number of the head-up display 15 mounted in the vehicle 10, which is stored in the memory 22. The partial image generating unit 31 refers to the table 60 stored in the memory 22 (see FIG. 3), reading out the reference location, the length in the lateral direction and the length in the longitudinal direction, of the cut-out region associated with the type number of the head-up display 15. The partial image generating unit 31 also determines the cut-out region 42 based on the reference location, the length in the lateral direction and the length in the longitudinal direction. FIG. 6 shows an example of a cut-out region 41 determined in a camera image 40 using the reference location P1 (q1, r1), the length in the lateral direction W2 and the length in the longitudinal direction H2, for a case where the vehicle 10 is a sedan. When the type of vehicle is a hatchback vehicle or a sport utility vehicle, the cut-out region is determined according to the reference location, length in the lateral direction and length in the longitudinal direction registered in the table 60. Another method may also be employed to determine the cut-out region 41 using different criteria related to the vehicle.

As can be seen by comparing FIG. 5 and FIG. 6, the length in the widthwise direction W2 of the vehicle 10 in the cut-out region 42 when it has been assessed that the road is not straight is greater than the length in the widthwise direction W1 when it has been assessed that the road is straight. This allows more of the road that is represented as extending in the lateral direction in the camera image 40 to be included in the cut-out region 42.

The correcting unit 34 of the processor 23 then assesses whether or not the vehicle 10 was traveling on a road with high road surface roughness when the camera image 40 was photographed (step S106). For example, the correcting unit 34 assesses whether or not the vehicle 10 was traveling on a road with high road surface roughness based on changes in the pitch angle of the vehicle 10 input from the pitch angle sensor 14. The details regarding assessment processing in step S106 will be described below.

When it has been assessed that the vehicle 10 was traveling on a road with high road surface roughness (step S106—Yes), the correcting unit 34 corrects the dimension of the cut-out region in the longitudinal direction, which was determined in S104 or S105 (step S107). The details regarding correction processing in step S107 will be described below.

When it has not been assessed that the vehicle 10 is traveling on a road with high road surface roughness (step S106—No), processing by the processor 23 proceeds to step S108 without correction of the cut-out region.

The correcting unit 34 then corrects the dimension of the cut-out region 41 in the lateral direction as determined in S104 or S105, based on the vehicle speed of the vehicle 10 at the time the camera image 40 was photographed (step S108). The details regarding the correcting method in step S108 will be described below.

The partial image generating unit 31 then generates a partial image by cutting out from the camera image 40 an image in the cut-out region as determined in S104 or S105, and corrected in S106 and S108 when prescribed (step S109). The partial image generating unit 31 stores in the memory 22 the partial image in association with the camera image photograph time and the location of the vehicle 10 at the camera image photograph time.

The partial image generating unit 31 then assesses whether or not the vehicle 10 has reached the destination, based on the destination for which it was notified by the navigation device (not shown) (step S110), and when the vehicle 10 has reached the destination (step S110—Yes), processing of the partial image generating device 18 is complete. When the vehicle 10 has not reached the destination (step S110—No), processing returns to step S101 and is repeated.

Next, the partial image generating device 18 sends the partial images, the camera image photograph time and the location of the vehicle 10 at the camera image photograph time, which are stored in the memory 22, to a server (not shown), through the wireless communication terminal 12 (step S111). The server that has received the information, such as the partial images, generates bird's eye images for each of the partial images taken of the same road, and combines the bird's eye images to generate a single road image in which the road is represented (see FIG. 1).

Assessment processing by the assessment unit 32 in step S102 of FIG. 4 will now be described in detail. The assessment unit 32 refers to the map input from the map information storage device 17 to assess whether or not the road represented in the camera image 40 is straight. For example, each time the camera image 40 and camera image photograph time are input from the camera 11, the assessment unit 32 reads in the map and the location of the vehicle 10 at the camera image photograph time, which are associated with the camera image photograph time by the camera image 40, from the memory 22. The assessment unit 32 acquires the curvature radius of the road zone in a predetermined assessment region in the traveling direction from the location of the vehicle 10 at the camera image photograph time, based on the map associated with the camera image photograph time by the camera image 40. The assessment unit 32 calculates the average value for the curvature radii for one or more road zones in the assessment region, and when the average value for the curvature radius is larger than a reference curvature radius, it assesses that the road represented in the camera image 40 is straight. When the average value for the curvature radius is less than a reference curvature radius, on the other hand, the assessment unit 32 assesses that the road represented in the camera image 40 is not straight.

For example, based on installation position information such as the optical axis direction and mounting position of the camera 11, which are stored in the memory 22, the assessment unit 32 determines the start point of the assessment region to be the crossing location where the optical axis of the camera image 40 crosses with the ground. The assessment unit 32 determines the end point of the assessment region to be the location at a predetermined distance (such as 100 m) from the crossing location to the traveling direction. The assessment unit 32 acquires the curvature radii of the road zones from the start point to the end point of the assessment region.

Figure 7:
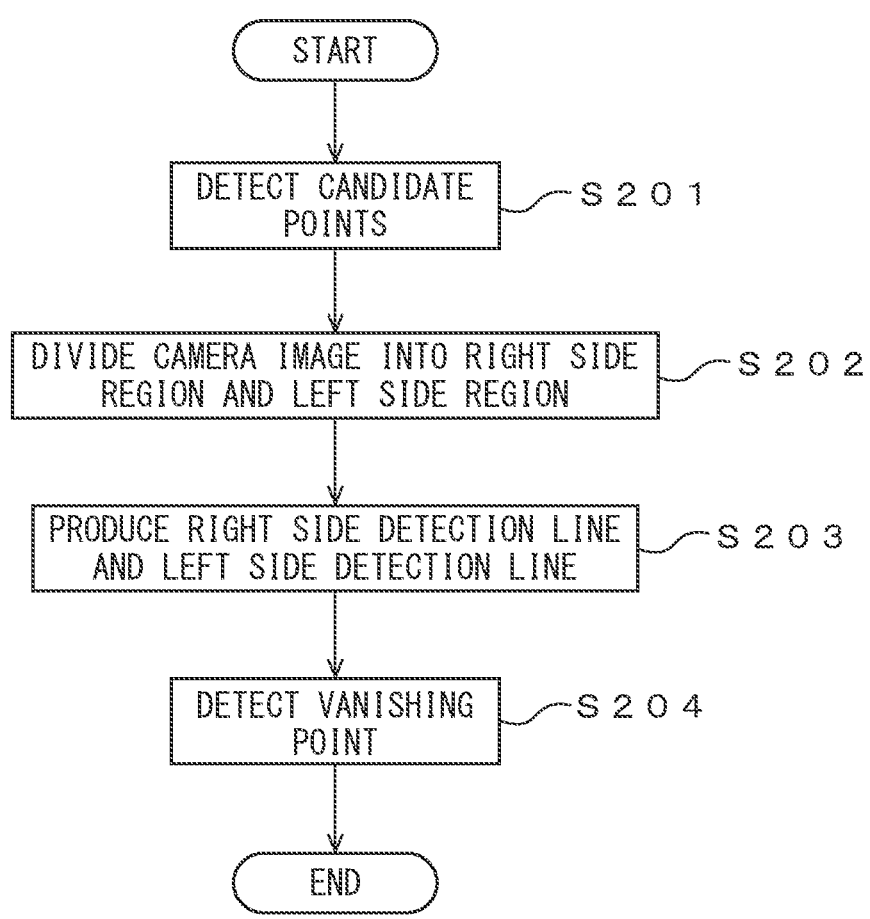
FIG. 7 is an operation flow chart for a vanishing point detector.
Figure 8:
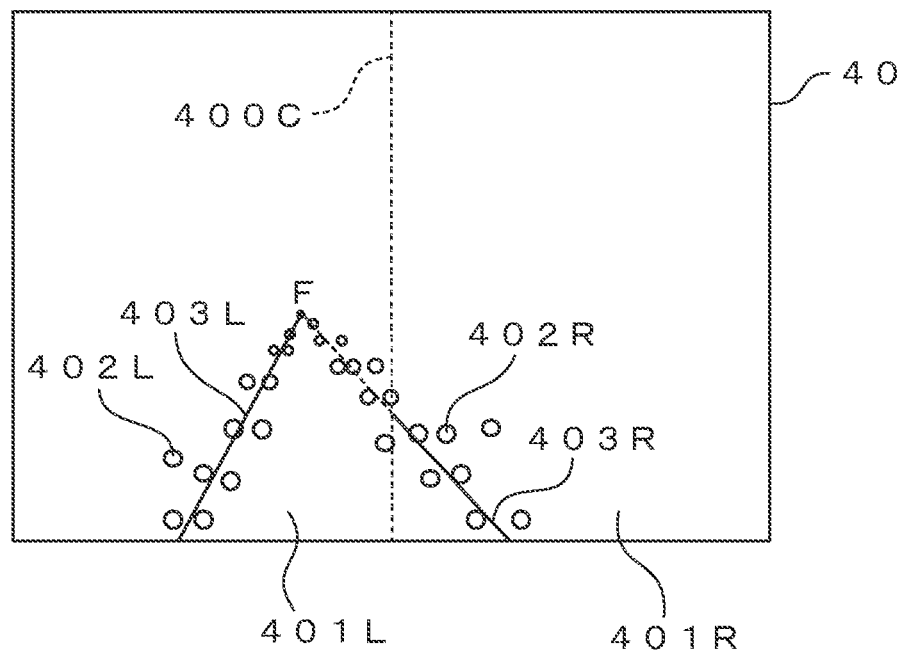
FIG. 8 is a diagram illustrating processing by a vanishing point detector.

Processing whereby the vanishing point F is detected in step S103 of FIG. 4 will now be described in detail with reference to FIG. 7 and FIG. 8. FIG. 7 is an operation flow chart for the vanishing point detector 33 of the processor 23 of the partial image generating device 18. FIG. 8 is a diagram illustrating processing by the vanishing point detector 33.

First, as shown in FIG. 8, the vanishing point detector 33 detects multiple candidate points in a predetermined comparison region set in the camera image 40 (step S201). For example, the vanishing point detector 33 may apply an edge detection filter such as a Sobel filter to the camera image 40 to detect edge pixels, and it may detect pixels having brightness above a predetermined threshold value among the detected pixels, as candidate points. The vanishing point detector 33 may also detect candidate points in the image by inputting the image into a discriminator, for example. The discriminator may use a deep neural network (DNN) that has been trained to detect lane marking lines in input images, for example.

The vanishing point detector 33 then divides the camera image 40 into a right side region 401R and a left side region 401L by a center line 400C, which are the projection components on the imaging surface on the zv axis of the vehicle coordinate system (step S202). The right side region 401R includes multiple candidate points 402R. The left side region 401L includes multiple candidate points 402L.

The vanishing point detector 33 then applies a Hough transform, for example, on a candidate point group that includes candidate points 402R located in the right side region 401R, to produce a right side detection line 403R. The vanishing point detector 33 applies a Hough transform, for example, on a candidate point group that includes candidate points 402L located in the left side region 401L, to produce a left side detection line 403L (step S203).

Next, the vanishing point detector 33 detects the vanishing point F of the road in the camera image 40, as the intersection where the right side detection line 403R and the left side detection line 403L cross in the camera image 40 (step S204).

Assessment processing by the correcting unit 34 in step S106 of FIG. 4 will now be described in detail. The correcting unit 34 calculates the change in pitch angle during a predetermined period immediately before the camera image photograph time, based on the pitch angle input from the pitch angle sensor 14. For example, the correcting unit 34 calculates the mean of the square of the change per unit time in the pitch angle during the predetermined period immediately before the camera image photograph time, and when the mean of the square is above a predetermined reference pitch angle value, it assesses that the vehicle 10 was traveling on a road with high road surface roughness when the camera image 40 was photographed. When the mean of the square of the change per unit time in the pitch angle during the predetermined period immediately before the camera image photograph time is below the predetermined reference pitch angle value, the correcting unit 34 assesses that the vehicle 10 was not traveling on a road with high road surface roughness when the camera image 40 was photographed. The predetermined period may be 10 seconds to 30 seconds, for example. The correcting unit 34 may also assess whether or not the vehicle 10 was traveling on a road with high road surface roughness when the camera image 40 was photographed, based on other assessment criteria.

Figure 9:
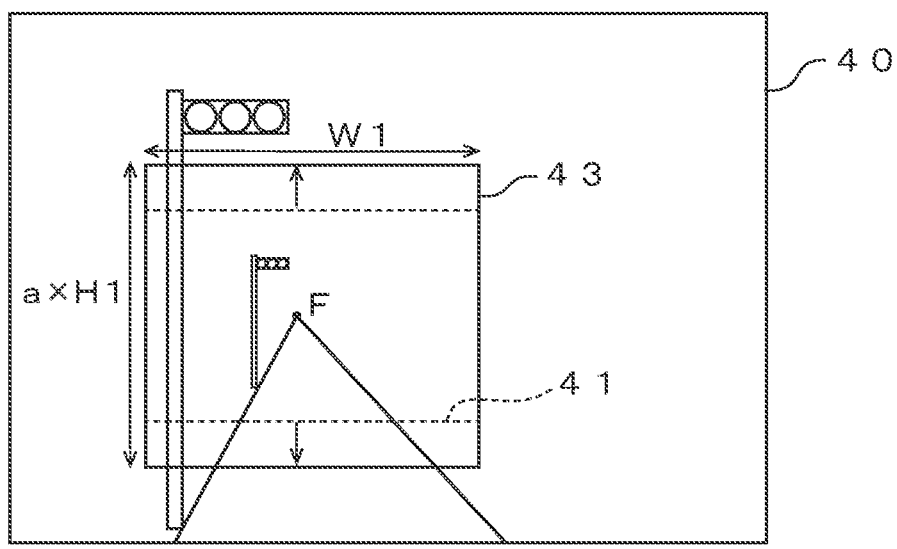
FIG. 9 is a diagram illustrating processing by a correcting unit (1).

Correction processing by the correcting unit 34 in step S107 of FIG. 4 will now be described in detail with reference to FIG. 9. As shown in FIG. 9, the correcting unit 34 sets the dimension in the longitudinal direction of the corrected cut-out region 43 so as to widen the dimension in the longitudinal direction of the cut-out region 41 before correction. For example, the correcting unit 34 calculates the dimension in the longitudinal direction of the corrected cut-out region 43 as the product of the length in the longitudinal direction H1 before correction and a predetermined coefficient "a" (a×H1). The coefficient "a" is a real number of 1 or greater. The real number for "a" may be in the range of 1.1 to 1.3. The partial image generating unit 31 determines the cut-out region 43 so that the vanishing point F of the road is at the center of a rectangular shape with length in the lateral direction W1 and length in the longitudinal direction a×H1. In the example shown in FIG. 9, the cut-out region 41 shown in FIG. 6 is used as the cut-out region before correction. The length in the lateral direction W1 of the cut-out region 43 after correction is the same as before correction. Thus, it is possible to photograph a camera image 40 so as to represent the road on which the vehicle 10 is traveling even when the pitch angle of the vehicle 10 has high variation such as when the vehicle 10 is traveling on a road with high road surface roughness.

Correction processing by the correcting unit 34 in step S108 of FIG. 4 will now be described in detail with reference to FIG. 10. The correcting unit 34 calculates the average value for the vehicle speed during the predetermined period immediately before the camera image photograph time, based on the vehicle speed input from the speed sensor 13. For example, the correcting unit 34 assesses that the speed of the vehicle 10 is a high speed when the average value for the vehicle speed during the predetermined period immediately before the camera image photograph time is greater than a predetermined reference speed. When the average value for the vehicle speed during the predetermined period immediately before the camera image photograph time is less than the predetermined reference speed, the correcting unit 34 assesses that the speed of the vehicle 10 is a low speed. When it has been assessed that the speed of the vehicle 10 is a high speed, the correcting unit 34 widens the dimension of the cut-out region compared to when the speed of the vehicle 10 is a low speed. When the speed of the vehicle 10 is a high speed, the image represented at the edges of the camera image 40 will sometimes be unclear. By widening the dimension of the cut-out region, therefore, the regions in the sections of the road represented at the edges of the camera image 40 are widened. The predetermined period may be 10 seconds to 30 seconds, for example. This increases the precision of processing whereby a bird's eye image of each of the plurality of partial images is generated at a server or the like and the plurality of bird's eye images are combined to generate a single road image in which the road is represented.

Figure 10:
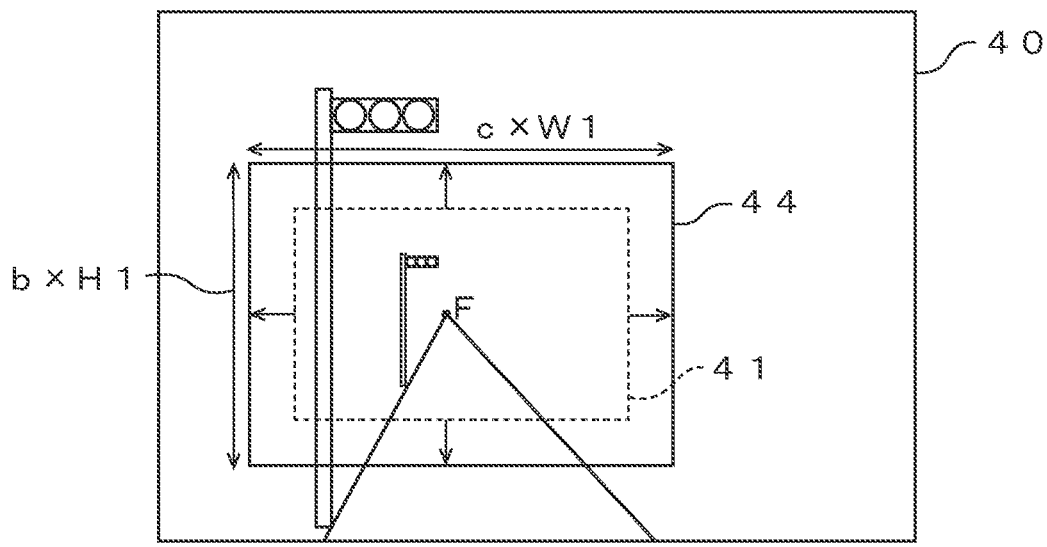
FIG. 10 is a diagram illustrating processing by a correcting unit (2).

In the example shown in FIG. 10, the correcting unit 34 sets the dimension in the longitudinal direction and the dimension in the lateral direction of the corrected cut-out region 44, so as to widen the dimension in the longitudinal direction and to widen the dimension in the lateral direction of the cut-out region 41 before correction. For example, the correcting unit 34 calculates the dimension in the longitudinal direction of the corrected cut-out region 44 as the product of the length in the longitudinal direction H1 before correction and a predetermined coefficient "b" (b×H1). The partial image generating unit 31 calculates the dimension in the lateral direction of the corrected cut-out region 44 as the product of the length in the lateral direction W1 before correction and a predetermined coefficient "c" (c×W1). The coefficients "b" and "c" are real numbers of 1 or greater. The real numbers for "b" and "c" may be in the range of 1.1 to 1.3. The partial image generating unit 31 sets the cut-out region 44 so that the vanishing point F of the road is at the center of a rectangular shape with length in the lateral direction c×W1 and length in the longitudinal direction b×H1, after correction. In the example shown in FIG. 11, the cut-out region 41 shown in FIG. 6 is used as the cut-out region before correction.

As explained above, the partial image generating device generates a partial image from an image in which the environment surrounding a vehicle has been photographed using an imaging unit provided in the vehicle, and assesses whether or not the road represented in the image is straight. When the partial image generating device has assessed that the road represented in the image is straight, it generates a partial image by cutting out a first region in the image that is estimated to contain the road, based on the vanishing point of the road, or when it has assessed that the road represented in the image is not straight, it generates a partial image by cutting out a second region in the image determined based on the type of vehicle. Since the road is thus represented at the same location in all of the partial images, this facilitates processing at the server for generating bird's eye images for each of the partial images photographed for the same road, and combining the bird's eye images to generate a road image in which the road is represented. In the prior art, partial images have been generated by cutting out a large enough region from the camera-photographed image so that the road is included in the image even when the road location differs in different partial images. With the present partial image generating device, however, the region of the partial image cut out from the camera-photographed image can be made smaller than the prior art, thus allowing reduction in the volume of data sent from the partial image generating device to the server.

A modified example 1 of the partial image generating device will now be described. In step S102 shown in FIG. 4, the assessment unit 32 assesses whether or not the road represented in the camera image 40 is straight, based on the location of the vehicle 10 at the time the camera image 40 was photographed, and the map information stored in the map information storage device 17. In the partial image generating device 18 of modified example 1, the assessment unit 32 of the processor 23 assesses whether or not the road represented in the camera image 40 is straight, based on the shape of the road represented in the camera image 40. For example, the assessment unit 32 uses the right side detection line 403R and the left side detection line 403L (see FIG. 8) that are estimated to represent the lane marking lines of the road detected in the processing of step S103, to assess whether or not the road represented in the camera image 40 is straight. The assessment unit 32 calculates an average value AR for the distance between the right side detection line 403R and each of the candidate points 402R detected in the right side region 401R. The assessment unit 32 also calculates an average value AL for the distance between the left side detection line 403L and each of the candidate points 402L detected in the left side region 401L. The assessment unit 32 assesses that the road represented in the camera image 40 is straight when the average value of AR and AL is below a predetermined reference distance. The assessment unit 32 may also assess whether or not the road represented in the camera image 40 is straight using another method, based on multiple candidate points 402R and multiple candidate points 402L.

A modified example 2 of the partial image generating device will now be described. In step S105 shown in FIG. 4, when it was assessed that the road represented in the camera image 40 is not straight (step S102—No), the cut-out region of the camera image 40 was determined uniformly. With the partial image generating device 18 of modified example 2, after the cut-out region in the camera image 40 has been set based on the type of vehicle 10 (step S105), the correcting unit 34 carries out processing to assess whether the road represented in the camera image 40 is clockwise (right-hand curve) or counterclockwise (left-hand curve). Based on the assessment results, the correcting unit 34 then corrects the location of the cut-out region in the camera image 40.

Figure 11:
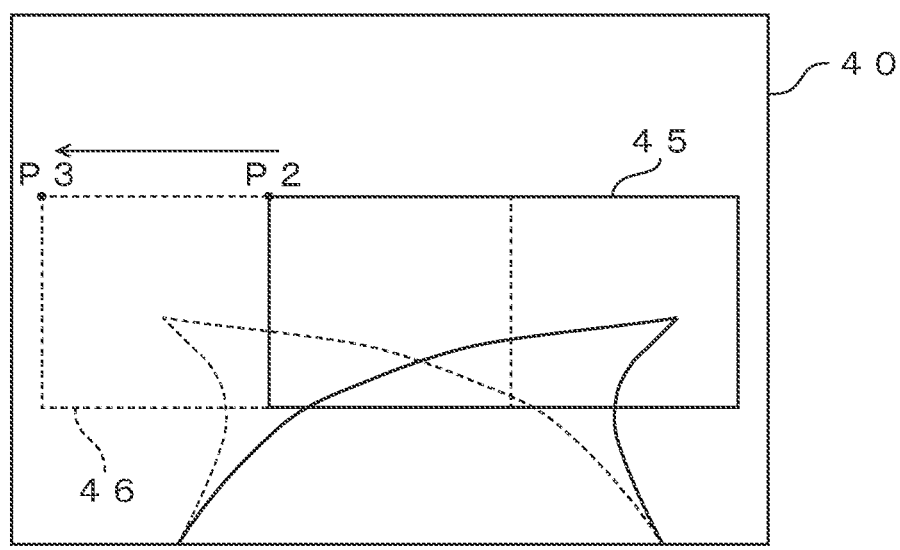
FIG. 11 is a diagram illustrating processing by a correcting unit (3).

FIG. 11 is a diagram illustrating the processing of the correcting unit for modified example 2. The correcting unit 34 refers to the map stored in the memory 22 to assess whether the road zone in the assessment region is clockwise or counterclockwise. The correcting unit 34 assesses whether the road represented in the camera image 40 is clockwise or counterclockwise based on the assessment results.

For example, when the road represented in the camera image 40 is counterclockwise, the correcting unit 34 corrects the cut-out region so that the reference location of the cut-out region is shifted in the left direction by a predetermined offset distance. When the road represented in the camera image 40 is clockwise, the correcting unit 34 does not correct the cut-out region.

FIG. 11 shows a cut-out region 45 for a case where the road represented in the camera image 40 is clockwise, and a cut-out region 46 for a case where it is counterclockwise. The cut-out region 45 when the road represented in the camera image 40 is clockwise has its reference location P2, lateral direction dimension and longitudinal direction dimension set so that it includes much of the region on the right side of the camera image 40. In this modified example, the cut-out region determined in step S105 is the cut-out region 45 when the road represented in the camera image 40 is clockwise. When the road represented in the camera image 40 is counterclockwise, on the other hand, the cut-out region 46 has its reference location P3 shifted in the left direction by a predetermined offset distance compared to the cut-out region 45 when the road is clockwise. The cut-out region 46 when the road represented in the camera image 40 is counterclockwise has its reference location P3, lateral direction dimension and longitudinal direction dimension set so that it includes much of the region on the left side of the camera image 40. The lateral direction dimension and longitudinal direction dimension of the cut-out region 46 are the same as the cut-out region 45. This allows the cut-out regions 45, 46 to be made smaller than the cut-out region 42, thus reducing the amount of data required for sending the partial image to the server.

In the embodiment described above, the vanishing point of the road was calculated for each photographed camera image, but the road vanishing point may instead be detected for one of a plurality of continuously photographed camera images, and the vanishing point of the detected road may be applied to the other camera images.

The embodiment described above employed a camera as the example of the imaging unit, and the camera may be one that takes still images or one that takes moving images. When moving images are taken, a partial image may be generated by the partial image generating device for each image of the moving images.

In addition, the camera in the embodiment described above photographed the environment ahead of the vehicle 10, but the camera may instead photograph the environment behind the vehicle 10.

The locations and dimensions of the cut-out regions in the camera image determined based on vehicle type were associated with the vehicle type through a head-up display type number for the embodiment described above, but the method of association is not limited to this. For example, the locations and dimensions of the cut-out regions in the camera image may be set according to vehicle type for each vehicle in which the partial image generating device is mounted, and stored in the memory.

The partial image generating device and storage medium that stores a computer program for partial image generation according to the embodiment described above may incorporate appropriate modifications that are still within the gist of the invention. Moreover, the technical scope of the invention is not limited to this embodiment, and includes the invention and its equivalents as laid out in the Claims.

The invention claimed is:

1. A partial image generating device comprising a processor configured to:
   generate a partial image from an image in which the environment surrounding a vehicle has been photographed using an imaging device provided in the vehicle; and
   assess whether or not the road represented in the image is straight,
   wherein the processor is configured to generate the partial image by cutting out a first region in the image that is estimated to contain the road based on the vanishing point of the road, when it has been assessed that the road represented in the image is straight, or to generate a partial image by cutting out a second region in the image that is determined based on the type of the vehicle, when it has been assessed that the road represented in the image is not straight.

2. The partial image generating device according to claim 1, wherein the dimension in the widthwise direction of the vehicle in the second region is larger than in the first region.

3. The partial image generating device according to claim 1, further comprising a storage device that stores map information, and
   wherein the processor is configured to assess whether or not the road represented in the image is straight, based on the location of the vehicle at the time the image was photographed and the map information stored in the storage device.

4. The partial image generating device according to claim 1, wherein the processor is configured to assess whether or not the road represented in the image is straight, based on the shape of the road represented in the image.

5. The partial image generating device according to claim 1, wherein the processor is also configured to assess whether the road represented in the image is a clockwise road or a counterclockwise road, when it has been assessed that the road represented in the image is not straight, and corrects the location of the second region in the image based on the assessment results.

6. The partial image generating device according to claim 1, wherein the processor is also configured to widen the dimensions of the first region or second region in the height direction of the vehicle, when it has been assessed that the vehicle was traveling on a road with high road surface roughness at the time the image was photographed, compared to when it has not been assessed that the vehicle was traveling on a road with high road surface roughness.

7. The partial image generating device according to claim 6, wherein the processor is also configured to assess whether or not the vehicle is traveling on a road with high road surface roughness based on changes in the pitch angle of the vehicle.

8. The partial image generating device according to claim 1, wherein the processor is also configured to change the dimensions of the first region or second region based on the speed of the vehicle at the time the image was photographed.

9. The partial image generating device according to claim 8, wherein when the speed of the vehicle is a high speed, the processor is configured to widen the dimensions of the first region or second region compared to when the speed of the vehicle is a low speed.

10. A computer-readable non-transitory storage medium that stores a computer program for partial image generation, and the computer program causes a processor to:
    generate a partial image from an image in which the environment surrounding a vehicle has been photographed using an imaging device provided in the vehicle; and
    assess whether or not the road represented in the image is straight,
    wherein the computer program causes the processor to generate the partial image by cutting out a first region in the image that is estimated to contain the road based on the vanishing point of the road, when it has been assessed that the road represented in the image is straight, or to generate the partial image by cutting out a second region in the image that is determined based on the type of the vehicle, when it has been assessed that the road represented in the image is not straight.

11. A partial image generation method wherein a partial image generating device executes to:
    generate a partial image from an image in which the environment surrounding a vehicle has been photographed using an imaging device provided in the vehicle; and
    assess whether or not the road represented in the image is straight,
    wherein the partial image generating device executes to generate the partial image by cutting out a first region in the image that is estimated to contain the road based on the vanishing point of the road, when it has been assessed that the road represented in the image is straight, or to generate the partial image by cutting out a second region in the image that is determined based on the type of the vehicle, when it has been assessed that the road represented in the image is not straight.

* * * * *